United States Patent [19]

Olson

[11] 4,000,648
[45] Jan. 4, 1977

[54] HIGH SENSITIVITY FLOWMETER

[75] Inventor: Jack R. Olson, San Diego, Calif.

[73] Assignee: The United States of America as represented by the Secretary of the Navy, Washington, D.C.

[22] Filed: Jan. 12, 1976

[21] Appl. No.: 648,304

[52] U.S. Cl. .............................. 73/189; 73/194 EM
[51] Int. Cl.² ........................................... G01F 1/58
[58] Field of Search ............ 73/189, 194 EM, 181, 73/170 A

[56] References Cited

UNITED STATES PATENTS

| | | | |
|---|---|---|---|
| 3,161,047 | 12/1964 | Griswold | 73/189 |
| 3,693,440 | 9/1972 | Olson | 73/194 EM |
| 3,881,350 | 5/1975 | Nosley | 73/194 EM |

FOREIGN PATENTS OR APPLICATIONS 1,528,050    4/1968    France .......................... 73/194 EM

*Primary Examiner*—James J. Gill
*Attorney, Agent, or Firm*—Richard S. Sciascia; Ervin F. Johnston; William T. Skeer

[57] ABSTRACT

An oceanographic flow sensor for use in component type electro-magnetic flowmeters includes a pair of spaced electrodes and a conductive coil wound thereabout having a small enclosed area. A sensor construction is also disclosed having a plurality of mutually perpendicular coils. A preferred embodiment uses a conductive coil wound along a bent winding axis such that mutually perpendicular sensing electrodes may use the electromagnetically generated field from a single winding.

13 Claims, 12 Drawing Figures

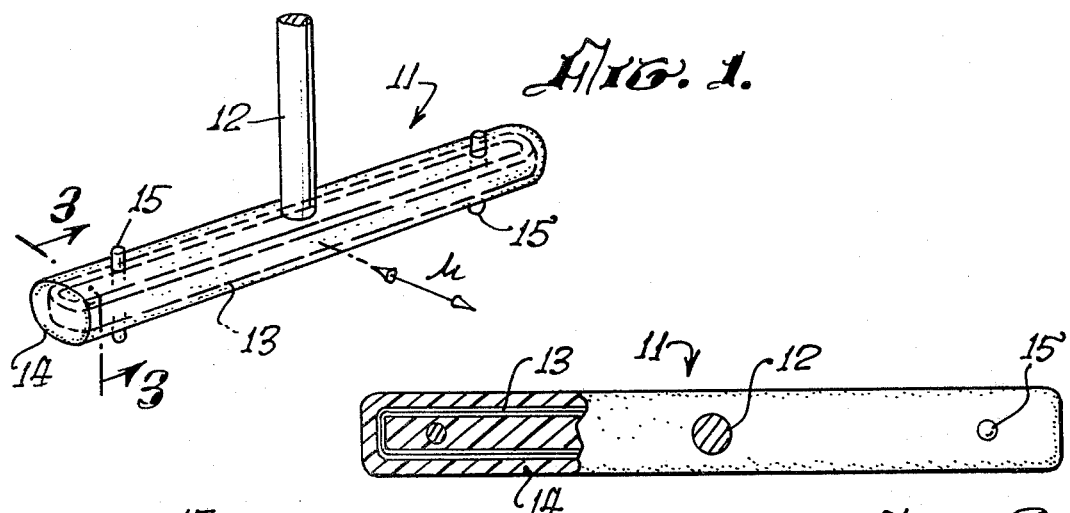
FIG. 1.
FIG. 2.
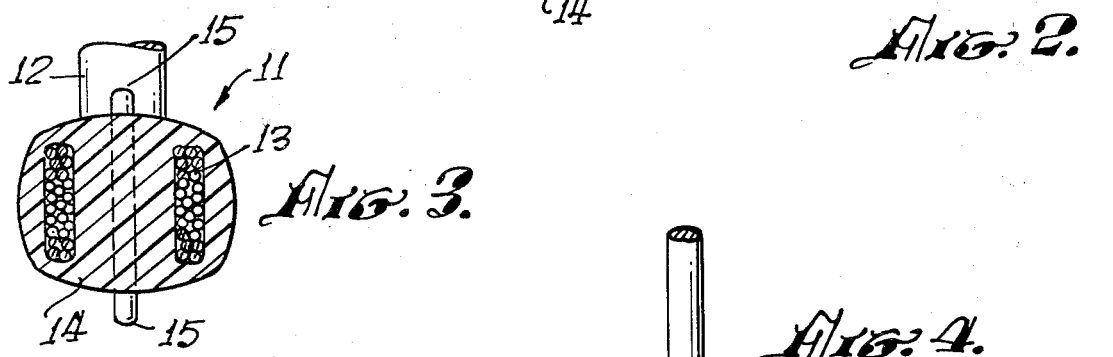
FIG. 3.
FIG. 4.
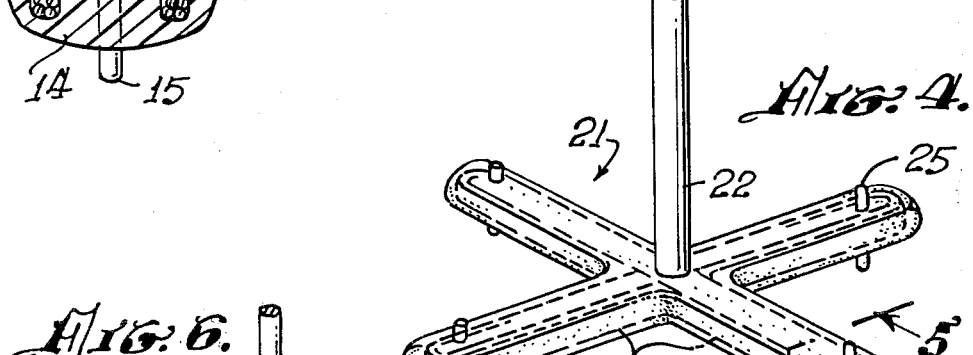
FIG. 6.
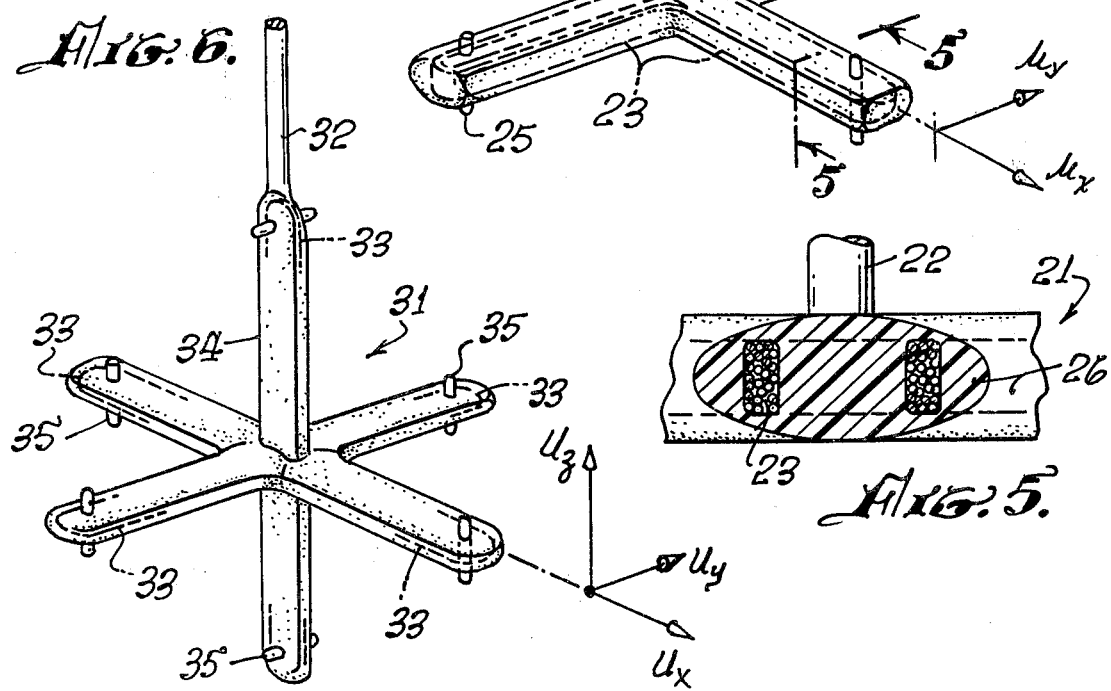
FIG. 5.

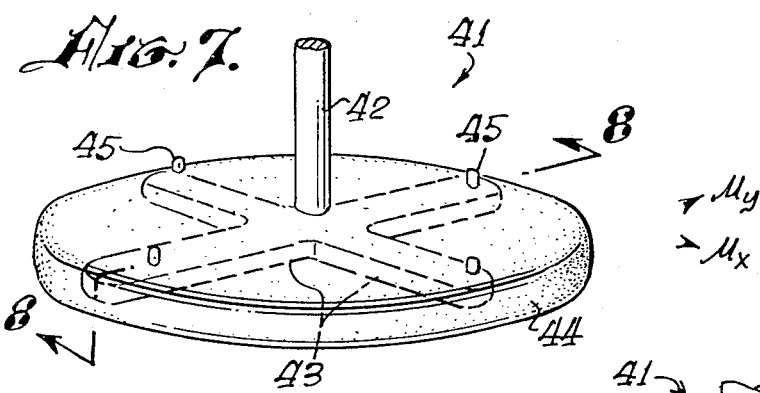
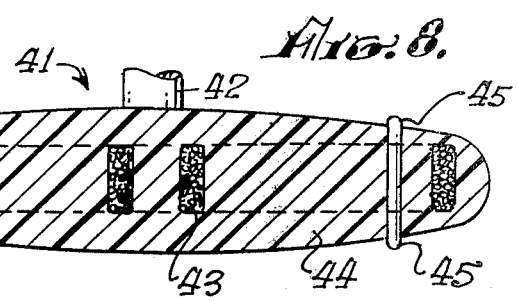
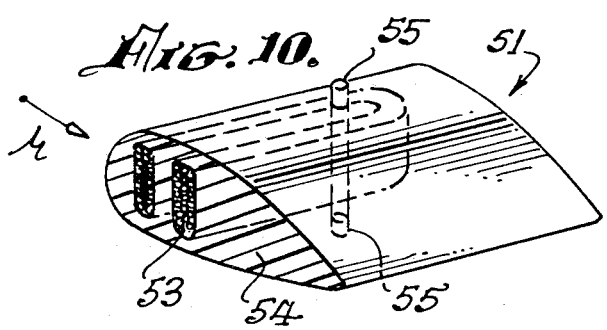
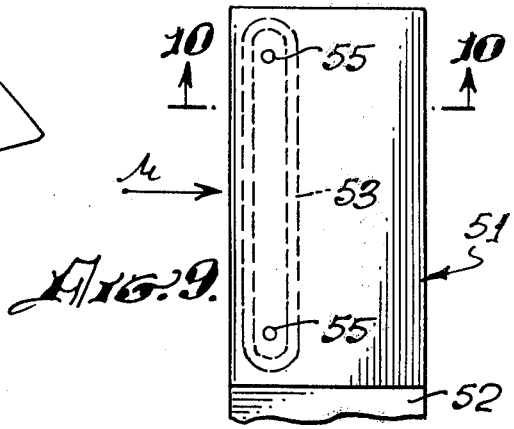
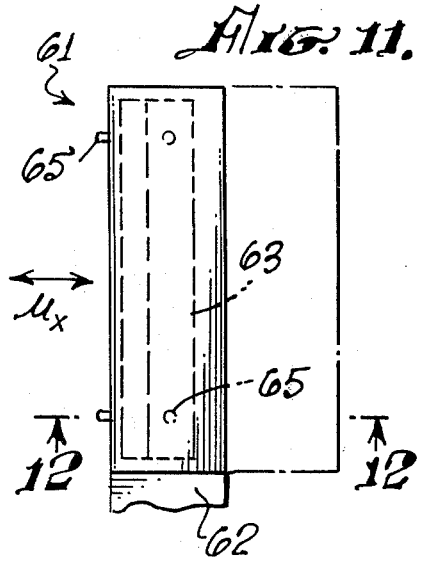
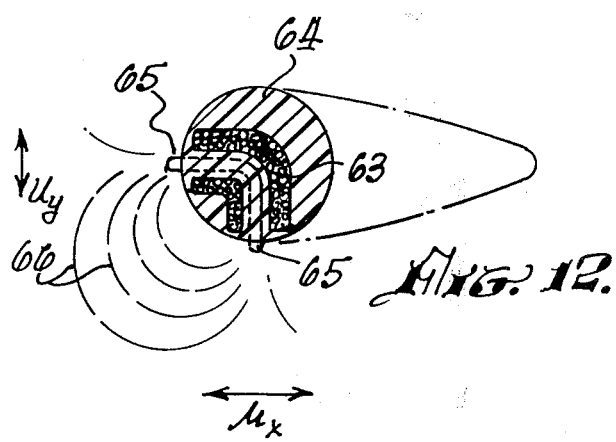

HIGH SENSITIVITY FLOWMETER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of oceanography. In greater particularity, this invention pertains to the field of oceanographic instrumentation. In still greater particularity, this invention pertains to the measurement of components of fluid flow within the ocean environment. By way of further characterization, this invention pertains to the field oceanographic flow sensors designed for low energy consumption. By way of further characterization, without limitation thereto, this invention pertains to an oceanographic flow sensor for use in measuring a plurality of flow components on an oceanographic station monitored by a low power oceanographic buoy.

DESCRIPTION OF THE PRIOR ART

There are numerous requirements for measuring the fluid flow of a conducting fluid medium and, particularly where this flow confined within a conductor, these requirements have been successfully achieved. However, the flow of conductive fluid in an unrestricted environment such as seawater within the ocean or turbulent flow within a large tank present many variables making accurate velocity measurements more difficult to achieve.

Various prior art fluid flow instruments have been devised to measure currents using mechanical devices such as impellers and other displaced mechanisms. Such mechanical type flowmeters, although satisfactory for their intended purposes, suffer from a lack of sensitivity required to measure small current flows necessary for determining the components of fluid motion in an open ocean environment such as discussed above.

Another type of flowmeter, known as the acoustic type, uses a timed difference of sound travel and doppler shifts in the received frequencies between two points to determine the fluid flow. Such devices while satisfactory in permanent installations in laboratory environments do not lend themselves to applications in the open ocean. That is, the sound level in the ocean tends to interfere with the operation of such devices and flowmeters of this type require relatively high power consumption and frequent maintenance.

The most promising type of oceanographic flowmeter employs an electromagnetic sensor. Such electromagnetic sensors make use of Faradays' Law which accounts for the potential difference induced in a conductor moving within a magnetic field. Thus, by placing spaced electrodes in a conducting medium the fluid flow there between may be considered as a moving conductor the velocity of which is the desired fluid velocity. Thus, it may be seen that the potential difference between the electrodes is directly proportioned to the velocity component of the fluid undergoing measurement.

Although relatively new in the art, great developmental strides have been made in electromagnetic flowmeters and instruments which are quite reliable and suitable for oceanographic functions have been developed.

For example, that shown in U.S. Pat. No. 3,693,440 granted on Sept. 26, 1972 to Jack R. Olson for "Electromagnetic Flow-Meter" has proven to be quite accurate as a laboratory measuring device and is employed in many high quality oceanographic instruments. The theoretical considerations of this type of flowmeter are well known and covered in the text books and professional journals of oceanography. For example, reference is made to an article appearing in the Marine Technology Society Journal, volume 6, number 1 of January-February 1972 pages 19 through 24 entitled "Two-Component Electromagnetic Flowmeter" by Jack R. Olsen and the government publication of the National Oceanographic Instrumentation Center issued by the United States Department of Commerce publication number RN-1009, a technical bulletin entitled "Electromagnetic Current Meter Evaluation."

Although, as indicated by the above mentioned publications, the state of the art with respect to electromagnetic flowmeters is well developed, a need persists for an effective sensor for this type instrument which will permit the inclusion of these instruments in oceanographic buoys which monitor oceanographic parameters for relatively long durations of time. Because such oceanographic buoys operate from relatively limited power sources such as batteries, or wave or wind powered generators, the power consumed by such instruments becomes a limiting factor in their applications.

Thus, in the aforedescribed laboratory type instruments a high intensity magnetic field of very uniform nature provides an extreme sensitivity required in laboratory applications. However, such meters require the expenditure of a relatively large amount of electrical energy to maintain the magnetic fields. Prior art attempts to limit this power consumed have employed standard techniques such as timed operations and other types of flowmeters to overcome this large power drain.

Although these techniques have provided useful measurements in the past, the need for a electromagnetic type flowmeter having a relatively low power drain has been a continuing problem in the oceanographic instrumentation field.

SUMMARY OF THE INVENTION

This invention utilizes spaced electrodes which are located in an electromagnetic field generated by an elongated electromagnetic coil. This elongated coil by reducing the area within the coil provides a relatively strong field for the amount of the electrical current to excite the coil and the configuration has resulted in sufficient uniformity to provide satisfactory sensitivity such that oceanographic flowmeters may be included in oceanographic station-keeping buoys. Additionally, a method of coil winding and construction has permitted the sharing of mutually perpendicular sensors within a common electromagnetic field. This novel construction has resulted in an instrument sensor with improved sensitivity over known electromagnetic types and require a modest amount of electrical power for the energization thereof.

STATEMENT OF THE OBJECTS OF THE INVENTION

The primary object of this invention is to provide an oceanographic sensor for an electromagnetic flowmeter.

Further object of this invention is the provision of a flowmeter sensor of the electromagnetic type requiring a modest power source for electromagnetic activation thereof.

Another object of this invention is to provide a flowmeter that can accurately sense a low-level flow within an ocean environment.

Still another object of this invention is to provide an oceanographic flowmeter that may be integrally formed with other oceanographic measurement structure such as to require a minimum of space in an instrumentation package.

Still another object of this invention is to provide an electromagnetic flow sensor for oceanographic applications in which the fluid flow may be measured in orthogonally related components by the utilization of a single energization field.

These and other objects of the invention will become more readily apparent from the ensuing specification taken together with the drawings.

BRIEF DESCRIPTION OF THE DRAWINGS

FIG. 1 is a perspective view of a single directional sensor according to the invention;

FIG. 2 is a top plan view of the embodiment shown in FIG. 1;

FIG. 3 is a sectional view taken along lines 3—3 of FIG. 1;

FIG. 4 is a perspective view of a two-directional component embodiment of the invention.

FIG. 5 is an sectional view taken along lines 5—5 of FIG. 4.

FIG. 6 is a perspective view of a three-component form of the sensor of the invention;

FIG. 7 is a perspective view of a two-component form of the invention embodied in a disk-lightning encasing cover;

FIG. 8 is a sectional view taken along lines 8—8 of FIG. 7;

FIG. 9 is a planned view of a streamlined form of the invention;

FIG. 10 is a perspective view of the arrangement shown in FIG. 9 with a sectional breakaway taken along lines 10—10 of FIG. 9;

FIG. 11 is a planned view of a two-component sensor according to the invention; and FIG. 12 is a section taken along lines 12—12 of FIG. 11.

DESCRIPTION OF THE PREFERRED EMBODIMENT

Referring to FIG. 1, electromagnetic sensor is indicated generally at 11. Sensor 11 includes a rod-like support 12 which provides mechanical support for the sensor and, if desired, may be used as a faring for the electrical connections made to the active components comprising the sensor. A coil 13 is illustrated as being encased within a cast support 14.

Cast support 14 may be made of any suitable dielectric material useful in the oceanographic arts such as an epoxy resin, for example. Of course, choice among the various castable dielectric materials is made in accordance with good design practice well established in the oceanographic engineering arts where such factors as cost, weight, resistance to weathering and corrosion are balanced one-against-the-other to arrive at satisfactory construction.

The pair of electrodes 15 pass through the encircled area in the center of coil 13 and establish the conductive path which comprises the moving conductor necessary for the flow measurement.

Referring to FIG. 2 it may be seen that electrodes 15 are spaced within the closed portion of coil 13 along the center line thereof and within the radiused ends of the coil. As may be readily seen, coil 13 has two parallel linear sides joined by a small radiused end portion. Since all the magnetic lines of force generated by coil 13 must pass through the center thereof, a resultant magnetic field is essentially perpendicular to the plane of the coil, as illustrated in FIG. 2, and parallel to the winding axis thereof in the region of electrodes 15. Thus, the magnetic field generated by coil 13 is relatively linear over the finite spacing between the electrodes 15.

Referring to FIG. 3, a sectional view taken along lines 3—3 of FIG. 1, it may be observed that coil 13 comprises a plurality of turns of conducting wire. These strands of wire are insulated, one-from-the-other and provide an inductive coil to generate the aforedescribed field.

As is also shown in FIG. 3, the encasing dielectric material 14 may be conventiently molded to provide a smooth hydrodynamic shape such that a minimal disturbance of the hydrodynamic flow results. It should be noted that the height of electrodes 15 as they protrude above casing 14 are illustrated in a somewhat exaggerated perspective to facilitate recognition and description thereof. In actual practicing a more nearly flush-mounted arrangement is preferred.

As will be well understood by those versed in the oceanographic instrumentation arts, the embodiment illustrated in FIGS. 1 through 3 will measure current flow in a single direction indicated by $v$ shown in FIG. 1. If measurement in more than a single direction is desired, other configurations may be employed.

Referring to FIG. 4, an extension of the construction shown in FIG. 1 illustrates how the invention may be embodied to measure oceanographic flow in two directions as indicated by $v_x$ and $v_y$. Thus, a cruciform type planar construction 21 is supported by a rod-like support 22 having two coils 23 encased within an epoxy plastic body 24. Electrodes 25 are positioned within the center area of coils 23 and along the major axis thereof such that a resulting configuration, as descrbed in connection with FIGS. 1 through 3, results with coils 23 being spaced at mutually right angles to each other such that fluid flow along the directions $v_x$ $v_y$ may be measured.

Referring to FIG. 5, it may be observed that the cast epoxy 24 forms an encasing means about coil 23 which is somewhat more streamlined and laminar in cross section than that illustrated in FIG. 1. The selection between various cross-sectional shapes is a somewhat empirical process and depends to some extent upon the desired strength of the arms and the space available for enclosing the sensor.

Referring to FIG. 6, a three-component form of the cruciform arrangement illustrated in FIG. 4 is illustrated. This embodiment, indicated generally at 31, includes a rod-like support 32 which is attached to one end of an encasing arm of cast dielectric material 34 and passes through the center of a cruciform arrangement of a type illustrated in FIG. 4. That is, the embodiment of FIG. 6 includes three arms of rod-like encasing dielectric housing 34 having three sets of electrodes 35 protruding therefrom and three separate coils 33 encapsulated therein and passing about the electrodes 35 in the aforedescribed fashion. As may be readily envisioned, this arrangement permits the measuring of fluid flow along three mutually perpendicular directions indicated as $v_x$, $v_y$, and $v_z$.

Thus, it may be seen that the basic configuration of the invention may be repeated to obtain measurements and a variety of directions. The reduced area of the coil which is obtained by flattening the coil to a narrow strip provides a "magnetic gain" which permits an increase in sensitivity of approximately five times over the conventional open coil type arrangement of the prior art. The precise elipicity required to obtain this gain may be calculated using standard formulae or obtained emperically. Factors such as wire size, magnetic permability of the housing, interelectrode capacitance must be considered as is well understood in the arts. However, the illustrated elipicity, ratio of major-to-minor axes, of 0.091 ($1/11$) may be considered an example near the upper limit of the useful range. Additionally, for small distances about electrodes contained within the confines of the coil, the magnetic field produced is quite uniform. Thus, a useful field strength may be obtained by using a small energization potential. This ability to operate with a lower power consumption is quite important for oceanographic buoys which have to remain on station for a long period of time with minimal service being required and a limited power source. Of course, other physical arrangements may suggest themselves to persons familiar with the oceanographic instrumentation arts and such physical dimensioning and arrangement may utilize the spacing and coil shapes of the invention to good effect. Similarly, it should be noted that for purposes of propaedeutic explanation, the electrodes have been illustrated as extending on both sides of the coil and protruding from the encasing support on both exterior faces thereof. Of course, if desired, the electrodes may extend outwardly from a single face of a support.

Referring to FIG. 7, a disk-like version 41 is illustrated as having a rod-like support 42 and a pair of coils 43 encased within a disk-like enclosure 44. This disk-like enclosure 44 may, for example, be the end of an instrument housing for other oceanographic measurement equipment. Thus, for example, the disk housing 44 may comprise the end of a salinity measuring cell or an electroacoustic transducer housing.

FIG. 8 is a section taken along lines 8—8 of FIG. 7 and illustrate a bilateral symmetry for a disk which is useful in free ocean applications. Of course, if only one surface of the disk 44 is exposed to the ocean currents, the other face may be conveniently configured as dictated by the other requirements of the housing.

FIG. 9 indicates a hydrofoil shaped version of the flow sensor shown generally at 51 which comprises an encasing housing 54 which is hydrodynamically shaped to be utilized as a hydrofoil or a portion thereof. This housing encases a coil 53 with spaced electrodes 55 along the major axis thereof and protruding through the surface of the encasing housing 54. This arrangement is shown at FIG. 10, which is a perspective view of the arrangement shown in FIG. 9 with a partial section taken along lines 10—10 of FIG. 9. This hydrofoil shaped dielectric enclosure 54 permits the arrangement illustrated to be used as a stabilizing fin of an oceanographic package or as a portion of such a stabilizing fin such that velocity of the package with respect to the water may be accurately measured. Of course, such arrangements of fluid flow sensors and hydrodynamic fins are known in the oceanographic instrumentation arts and, in the arrangement illustrated, perform the same function as the prior art arrangements but utilizing the low power drain electromagnetic configuration of the invention.

Another use for the embodiment of FIG. 9 is to place it on a package carried by a marine mammal. In such an arrangement the detector is used to measure the speed that the animal achieves in swimming and diving. Such information has extended man's knowledge of these ocean animals.

Referring to FIGS. 11 and 12, a low energy form of the system of the invention is illustrated and, as may be readily seen, utilizes a single coil 63 which is bent along the winding axis such that the two emerging faces extending from the dielectric housing 64 are at right angles to each other rather than being on opposite faces thereof. Although the external field in the vicinity of sensor 61 is asymmetrical, in the vicinity of sensing electrodes 65 there is little difference between the intensity and linearity of the field and that of a normal or unbent coil. Thus, the electrodes 65 may measure oceanographic currents $v_x$ and $v_y$ at mutually right angles with a single coil. Thus, power consumption for a two axis measurement is but one half of that required for a system employing a pair of the coils of the previously described embodiments. As illustrated, the dielectric encasing means 64 may be configured as a hydrofoil as well as a rod, if desired, and thus achieve the benefits of this improved construction.

The foregoing description taken together with the appended claims constitutes a disclosure such to enable a person skilled in the oceanographic and electronic instrumentation arts and having the benefit of the teachings contained therein to make and use the invention. Further, the structure herein described meets the aforestated objects of the invention, and generally constitutes a meritorious advance in the art unobvious to such a person not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. An oceanographic flow sensor of the electromagnetic type comprising:

elongated conductive coil means having a major and a minor axis, relatively configured for defining a relatively small central area for creating a magnetic field therein in response to electrical currents flowing in said conductive coil means having a field strength of approximately five times the strength of a circular coil of the same diameter as the major axis;

spaced electrode means located within said small central area and configured and structurally adapted to interact with ocean currents for effectively sensing fluid flow thereacross;

encasing means enclosing said elongated conductive coil means for providing a protective cover therefor and for supporting said spaced electrode means in a fixed position with respect to said elongated conductive coil means and making a unitary assembly therewith; and support means effectively connected to said encasing means for positioning said elongated conductive coil means and spaced electrode means assembly in a predetermined spatial relationship within the oceanographic environment.

2. An oceanographic flow sensor according to claim 1 in which the elongated conductive coil means comprises a plurality of individual coils.

3. An oceanographic flow sensor according to claim 2 in which each of the individual coils have the axis of their windings mutually perpendicular to remaining coils.

4. An oceanographic flow sensor according to claim 2 in which the plurality of individual coils number two.

5. An oceanographic flow sensor according to claim 4 in which the aforesaid encasing means is cast of dielectric material.

6. An oceanographic flow sensor according to claim 5 in which the encasing dielectric material is cast in a flat disk shape.

7. An oceanographic flow sensor according to claim 5 in which the encasing dielectric material is cast in a cruciform shaped solid.

8. An oceanographic flow sensor according to claim 3 in which the plurality of individual coils number three.

9. An oceanographic flow sensor according to claim 1 in which the elongated conductive coil means have windings having a linear portion of conducting material parallel to a similar linear portion diametrically opposed thereto with small radiused ends completing each loop of the conductive coil.

10. An oceanographic flow sensor according to claim 9 in which the spaced electrode means are located along the center line midway between the linear portions of the coil and spaced between the radiused centers of the small radiused end portions thereof.

11. An oceanographic flow sensor according to claim 1 in which the encasing means is a cast dielectric material.

12. An oceanographic flow sensor according to claim 1 in which the elongated coil means is wound along an angular winding axis.

13. An oceanographic flow sensor according to claim 12 in which the angle of the winding axis is 90°.

* * * * *